United States Patent
Murad et al.

(10) Patent No.: US 7,035,823 B2
(45) Date of Patent: *Apr. 25, 2006

(54) TELECOMMUNICATIONS SYSTEM FOR GENERATING A THREE-LEVEL CUSTOMER BEHAVIOR PROFILE AND FOR DETECTING DEVIATION FROM THE PROFILE TO IDENTIFY FRAUD

(75) Inventors: Uzi Murad, Tel Aviv (IL); Gadi Pinkas, Ganey Tikva (IL)

(73) Assignee: Amdocs Software Systems Limited, Dublin (IE)

( * ) Notice: Subject to any disclaimer, the term of this patent is extended or adjusted under 35 U.S.C. 154(b) by 187 days.

This patent is subject to a terminal disclaimer.

(21) Appl. No.: 10/013,558

(22) Filed: Dec. 11, 2001

(65) Prior Publication Data

US 2002/0184080 A1 Dec. 5, 2002

Related U.S. Application Data

(63) Continuation of application No. 09/294,567, filed on Apr. 20, 1999, now Pat. No. 6,526,389.

(51) Int. Cl.
*G06F 17/60* (2006.01)

(52) U.S. Cl. .............. 705/39; 705/10; 705/27; 705/44

(58) Field of Classification Search ............ 705/10, 705/39, 44, 27
See application file for complete search history.

(56) References Cited

U.S. PATENT DOCUMENTS

| | | | |
|---|---|---|---|
| 5,375,244 A | 12/1994 | McNair | 395/725 |
| 5,465,387 A | 11/1995 | Mukherjee | 455/26.1 |
| 5,602,906 A | 2/1997 | Phelps | 379/114 |
| 5,706,338 A | 1/1998 | Relyea et al. | 378/189 |
| 5,729,597 A | 3/1998 | Bhusri | 379/115 |
| 5,734,977 A | 3/1998 | Sanmugam | 455/410 |
| 5,745,558 A | 4/1998 | Richardson, Jr. et al. | 379/189 |
| 5,790,645 A | 8/1998 | Fawcett et al. | 379/189 |
| 5,805,686 A | 9/1998 | Moller et al. | 379/198 |
| 5,819,226 A | 10/1998 | Gopinathan et al. | 705/1 |
| 5,873,099 A | 2/1999 | Hogan et al. | 707/204 |
| 5,884,289 A | 3/1999 | Anderson et al. | 705/44 |
| 5,907,803 A | 5/1999 | Nguyen | 455/410 |
| 5,940,751 A | 8/1999 | Kaplan et al. | 455/411 |
| 6,026,397 A * | 2/2000 | Sheppard | 707/5 |
| 6,094,643 A | 7/2000 | Anderson et al. | 705/44 |
| 6,185,415 B1 | 2/2001 | Boatwright | 455/410 |

(Continued)

FOREIGN PATENT DOCUMENTS

EP 0891069 A2 1/1999

(Continued)

OTHER PUBLICATIONS

Mark "Digital Analysis Tests and Statistics Datas" Data 2000 for Excel 97, 11 pages.*

(Continued)

*Primary Examiner*—Romain Jeanty
(74) *Attorney, Agent, or Firm*—Brown Raysman Millstein Felder & Steiner LLP

(57) ABSTRACT

Telecommunications apparatus and method for detecting any unusual activity in customer behavior. A comprehensive behavior profile of a customer is generated on the basis of customer transactions. The profile includes a short-term customer behavior obtained from all of the customer's transactions, and further includes a long-term customer behavior obtained on the basis of the generated short-term behavior. Any behavior deviation from the profile is detected and identified as fraudulent or unusual.

22 Claims, 11 Drawing Sheets

U.S. PATENT DOCUMENTS 6,314,204 B1 * 11/2001 Cham et al. ................. 382/228
6,330,546 B1 * 12/2001 Gopinathan et al. .......... 705/35
6,535,728 B1 * 3/2003 Perfit et al. ................. 455/410

FOREIGN PATENT DOCUMENTS

WO        WO 8906398 A1 * 7/1989

OTHER PUBLICATIONS

Vector: Kite "General Information Manual", Dec. 1996; Sterling Commerce, 33 pages.*

Fawcett et al., "Adaptive Fraud Detector", NYNEX Science and Technology, pp. 1-29.

* cited by examiner

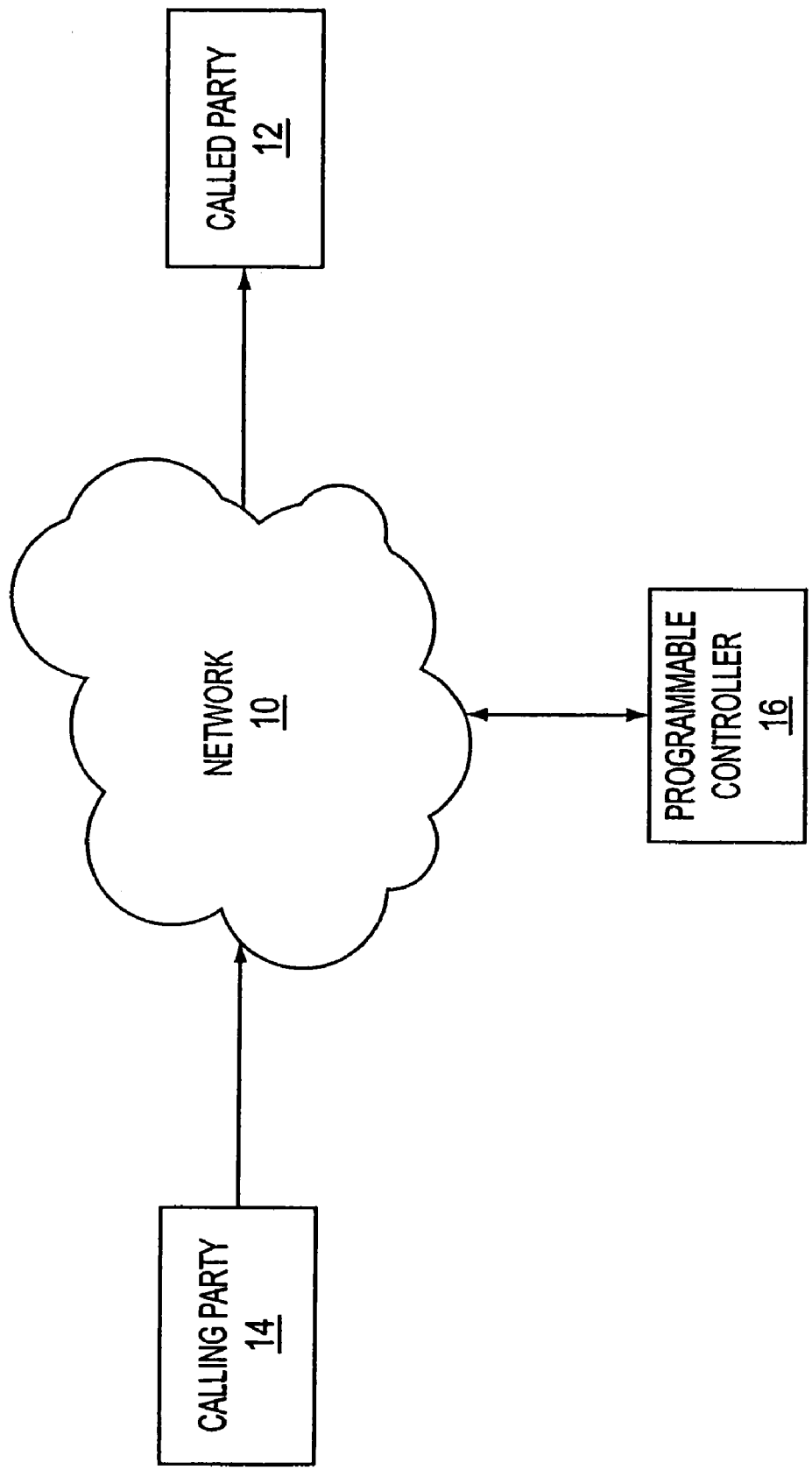

FIRST LEVEL PROFILE: CALL PROFILE

| DURATION | START TIME | DESTINATION TYPE | CALL TYPE | ... | ... |

CALL DETAIL RECORD (CDR) 100

DURATION = NUMERICAL

START TIME = NUMERICAL

DESTINATION TYPE = (LOCAL, INTERNATIONAL, PREMIUM RATE SERVICE (PRS), TOLL-FREE)

CALL TYPE = (VOICE, DATA)

FIG. 1B

| THE NUMBER OF DAYS THAT A DAILY PROTOTYPE HAS BEEN OBSERVED DURING A SELECTED PERIOD OF TIME (1ST FIELD) | THE TOTAL NUMBER OF TELEPHONE CALLS MADE DURING THE SELECTED PERIOD OF TIME (2ND FIELD) | THE NUMBER OF TELEPHONE CALLS MADE ON EACH DAY IS SQUARED AND THE PRODUCTS ARE SUMMED FOR THE SELECTED PERIOD OF TIME (3RD FIELD) |
|---|---|---|
| 502 | 504 | 506 |

DAILY PROTOTYPE RECORD 500

FIG. 5

TELECOMMUNICATIONS SYSTEM FOR GENERATING A THREE-LEVEL CUSTOMER BEHAVIOR PROFILE AND FOR DETECTING DEVIATION FROM THE PROFILE TO IDENTIFY FRAUD

This is a continuation of application Ser. No. 09/294,567, filed Apr. 20, 1999, now U.S. Pat. No. 6,526,389.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The present invention is related to telecommunications, and in particular, to a telecommunications system and method for generating a normal behavior profile of a customer and for determining a deviation from the generated profile to detect fraudulent activity.

It is well known that the telecommunications industry regularly suffers major losses due to fraud. The various types of fraud may be classified into two categories: subscription fraud and superimposed fraud. In subscription fraud, an account is obtained without any intention to pay the bill. In such cases, abnormal usage occurs throughout the active period of the account. The account is usually used for call selling or intensive self-usage, for example. The superimposed fraud is carried out when fraudsters "take over" a legitimate account. The abnormal usage is superimposed upon the normal usage of a legitimate customer. Examples of such cases include cellular cloning, calling card theft, and cellular handset theft, to name a few.

To combat telecommunications fraud, various conventional techniques attempt to discover so-called "probably fraudulent" patterns based on historical data and then to detect the "probably fraudulent" patterns. The fraud detection system collects data representing the prior transactions by the calling party, by the user of credit or debit cards, etc. The collected data is then searched for the "probably fraudulent" patterns in user behavior. For example, if the person's international telephone calls continue for over 2 hours in a 24-hour time period, such activity would most likely constitute a fraudulent pattern.

This conventional approach to fraud detection, however, is limited in several ways and has a number of disadvantages. First, fraud patterns are customer-dependent. Since each customer demonstrates an individual behavior, certain usage patterns may be suspicious for one customer, but are normal for another. Second, in order to construct a comprehensive fraud classification system, examples of all fraud patterns must be taken into account. The large number of possible fraud patterns and the constant emergence of new ones make it impractical to create such a fraud classification system. Further, it is difficult to obtain training data that is properly classified as fraudulent and non-fraudulent.

A need therefore exists to overcome the disadvantages of the above-noted fraud detection approaches, as well as other conventional approaches to fraud detection in the telecommunications industry.

SUMMARY OF THE INVENTION

It is an object of the present invention to generate a normal (ordinary) behavior profile of a customer.

It is another object of the present invention to detect a deviation from the generated normal behavior profile.

It is yet another object of the present invention to identify any unusual activity on behalf of the customer.

These and other objects, features and advantages are accomplished by a computer implemented method and apparatus for determining a normal customer behavior profile that includes a plurality of transactions pertaining to an activity. The normal behavior profile is used to alert of an unusual activity. According to the present invention, a number of prototypical transactions is selected from a plurality of transactions. The extracted prototypical transactions collected during a first predetermined time interval are arranged into a first behavior profile. A plurality of first behavior profiles is obtained during a second predetermined time interval that is comprised of a plurality of first predetermined time intervals. The first behavior profiles obtained during the second predetermined time interval are arranged into a number of clusters. A prototypical first behavior profile is determined for each cluster, and the determined prototypical first behavior profiles are arranged into a plurality of records for representing a second behavior profile.

In accordance with one aspect of the present invention, each prototypical first behavior profile is located at a respective center of each cluster.

In accordance with another aspect of the present invention, each transaction is defined by at least one attribute which is represented either non-numerically or numerically.

BRIEF DESCRIPTION OF THE DRAWINGS

The following detailed description is read in conjunction with the accompanying drawings, in which:

FIG. 1A is a system block diagram of the present invention in accordance with one embodiment thereof;

FIG. 1B shows a first level profile and is a block diagram of a call detail record (CDR) containing various fields which represent attributes of a call;

FIG. 5 is a block diagram of a daily prototype record as the result of extracting the daily prototypes;

DETAILED DESCRIPTION OF THE PREFERRED EMBODIMENTS

Figure 2A:
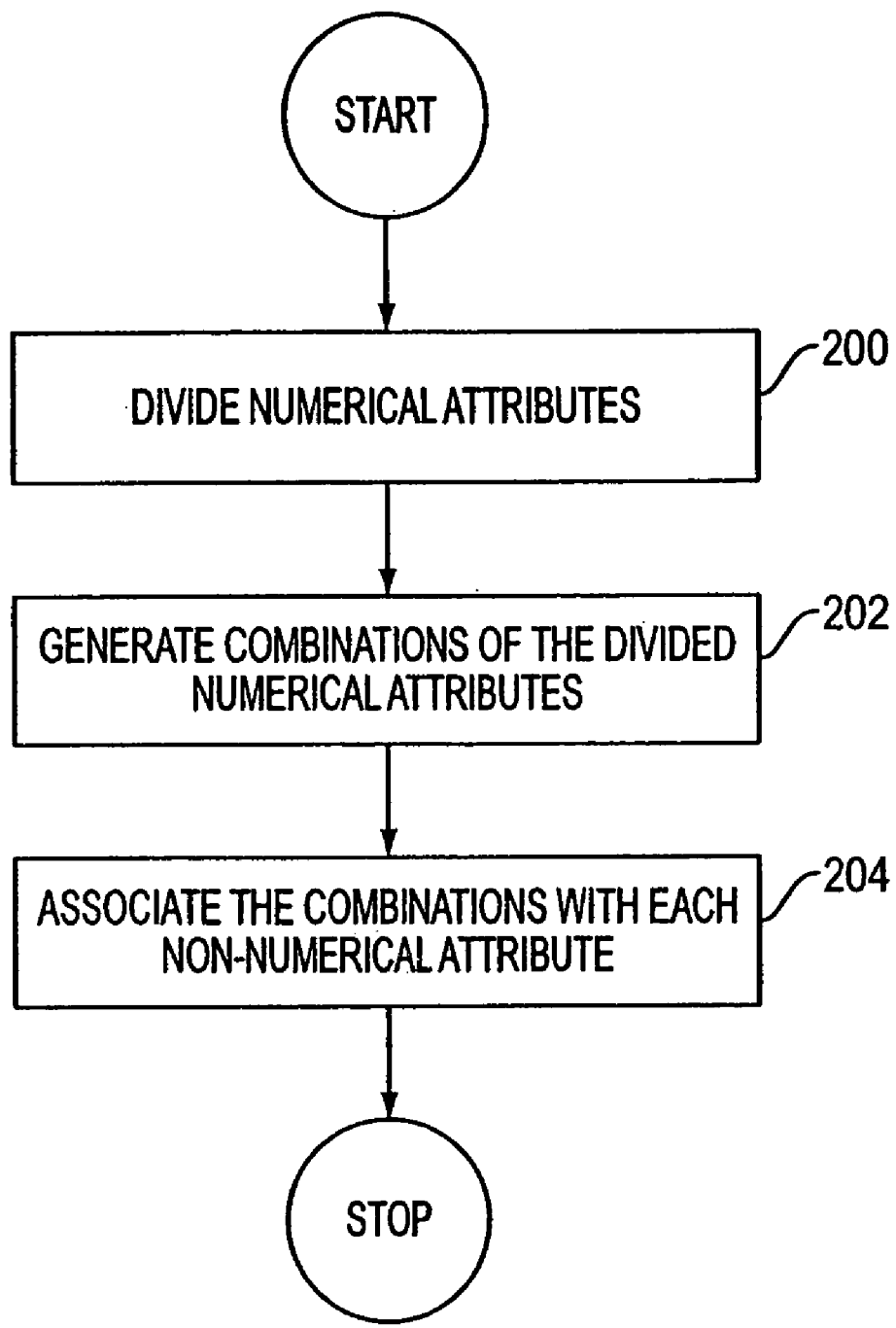
FIG. 2A is a flowchart for prototyping the first level profile according to the present invention.

As a general overview, the present invention detects fraud in telecommunications by determining any significant deviation from the customer's normal (ordinary) behavior. Unlike the conventional methods that detect "probably fraudulent" patterns, the present invention constructs a comprehensive multi-level model of the normal behavior and detects any deviation from the normal behavior. The inventive model of the normal behavior captures a variety of customer's behaviors on the basis of multiple transaction attributes. Three hierarchical profile levels are generated, and each profile level is generated on the basis of the preceding (lower) profile level. Once the normal behavior model is established, a new instance of customer's behavior is compared to the normal behavior model; and a significant deviation is alerted as fraudulent. In the present invention the term "deviation" includes a dissimilarity between any two instances of behavior representation.

In conjunction with the figures, a telephone system will now be described in detail as one representative embodiment of the present invention. As shown in a system block diagram of FIG. 1A, a calling party 14 places a telephone call to a called party 12 via a network 10. Also connected to the network 10 is a programmable controller 16 which may be embodied as a general-purpose computer programmed to perform the inventive operations as described hereinbelow and illustrated in the figures. Alternatively, the programmable controller 16 may be a specific computer programmed to execute those inventive operations.

FIG. 1B shows a block diagram of a call detail record (CDR) 100 containing various fields which represent attributes of the telephone call placed between the calling and called parties of FIG. 1A. The programmable controller 16, which may be located in a system of a local or long distance carrier, generates the CDR 100 offline for every telephone call. The CDR 100 is generated after the completion of the call. As shown in FIG. 1B, some representative fields of the CDR 100 for the landline telephone call that are relevant to a customer behavior are duration, start time, destination type, call type. It is understood, of course, that additional fields (attributes) may be included depending on the call. For example, an attribute specifying the origination location of the call is important to the providers of wireless (cellular) services; while long-distance carriers may require an attribute that specifies countries and/or continents, for example.

Referring to FIG. 1B, the duration and start time of the telephone call take on numerical values. The destination type may be classified as Local, International, Premium Rate Services, Toll-free, and the call type is either voice or data.

Pertaining to one call, the CDR 100 as generated by the programmable controller 16 represents the first level profile (a so-called call profile), as indicated in FIG. 1B. Call prototypes are extracted from the first level profile in accordance with FIG. 2A. In accordance with the present invention, a set of prototypes is obtained by prototyping the call profile in such a way that any new call has a prototype either substantially similar or substantially dissimilar to any member in the set of the prototypes.

Figure 2B:
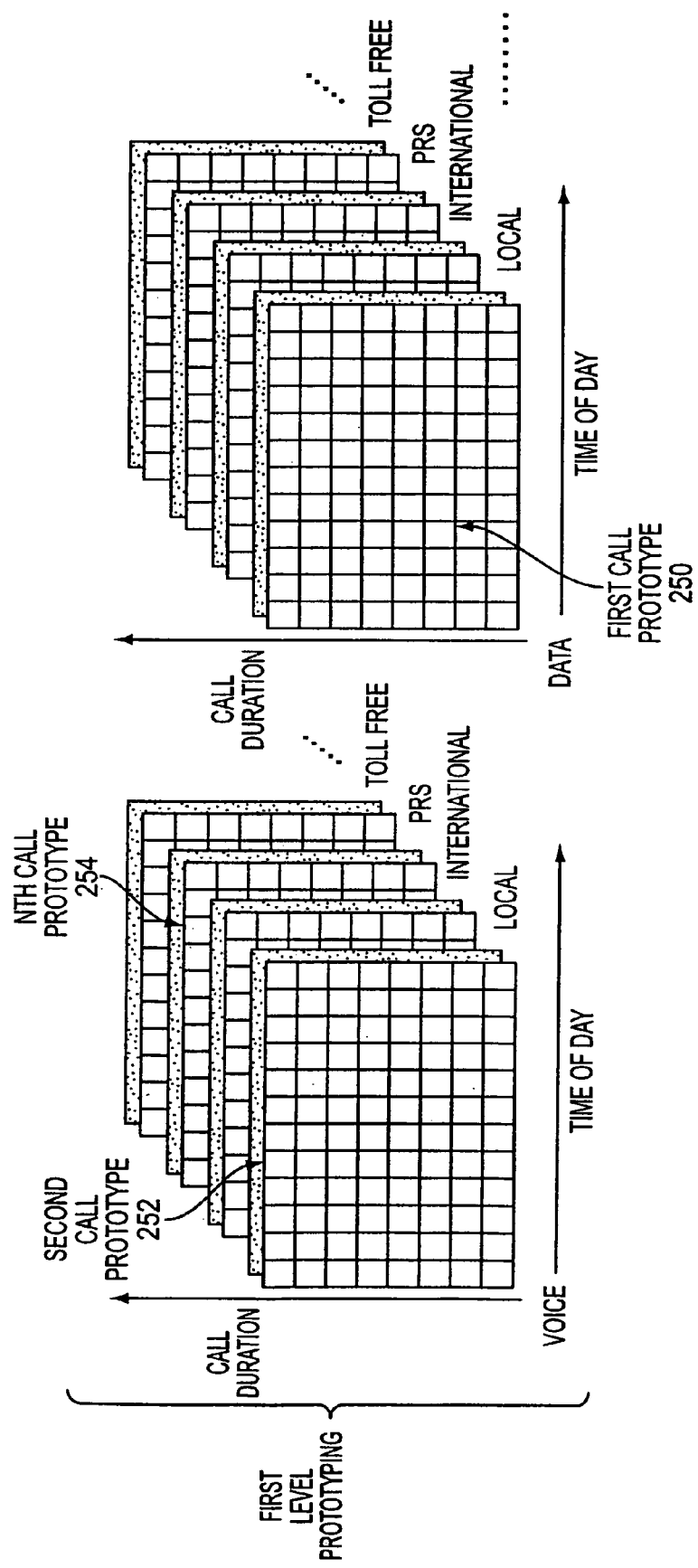
FIG. 2B graphically illustrates the operation of prototyping the first level profile of FIG. 2A.

The results of prototyping the call profile are illustrated in FIG. 2B. In particular, the above-described attributes of the call (the CDR fields) that are defined by numerical values are divided into a finite and preferably small number of values (step 200 of FIG. 2A). These attributes are the duration and start time in the example of FIG. 1B. The values for the duration of the telephone call are theoretically infinite, ranging from 0 seconds to N seconds; and similarly the start time contains numerous entries, defined by 00-hr, 00-min, 00-sec to 23-hr, 59-min, 59-sec. In accordance with one aspect of the present invention, the call duration is divided into a predetermined finite number of values. For example, 12 five-minute intervals cover any call up to an hour long. Since a predominant majority of the calls are shorter than one hour, such 12 values representing the duration of the call do not introduce any significant error into the analysis.

Similar to the duration time, the start time of the call is partitioned into a finite number of values (step 200 of FIG. 2A). For example in accordance with one embodiment, 12 two-hour time windows adequately represent the start time attribute of the telephone call. While the two attributes of duration and start time both are divided into 12 in this example, the identical partitioning is not a requirement of the present invention. The numerical attributes can be represented by any number of discreet values that are independent of each other. It will be appreciated that the processing speed and storage requirements of the system are not directly affected by the number of values resulting from the partitioning operation, because a vector contains, on average, 3 non-zero entries. The entries are stored in memory in avariable-length vector.

Following the above-described division of each numerical attribute into a predetermined finite number, the operation of prototyping the call profile is completed as follows: the combination of all generated values of numerical attributes is generated as shown in step 202 in FIG. 2A, and the generated combinations are associated with the non-numerical attributes of the telephone call (step 204 in FIG. 2A). In particular, referring to the above example of 12 values each for the call duration and start time, there are 144 combinations or call prototypes, so-called prototypical calls. Since the destination type attribute is non-numerical, 144 prototypes are allocated to each of the four values of this attribute (Local, International, Premium Rate Services, Toll-free) resulting in 756 call prototypes. Further, there are 2 values of non-numerical call type (Voice, Data). As the result, the total number of call prototypes is 1152.

FIG. 2B graphically illustrates the above-described operation of call profile prototyping to facilitate the understanding thereof. In the X-Y coordinate plane, the call duration values are plotted along the Y-axis, and the start time values are plotted along the X-axis labeled "Time of Day". Each depicted square, located at the intersection of X-Y coordinates in FIG. 2B, represents a call prototype (a prototypical call), such as a first Call Prototype 250, a second Call Prototype 252, an N-th Call Prototype 254, etc. Further shown in FIG. 2B are four X-Y planes for each instance of the destination type attribute; and the sub-space containing the four X-Y planes is provided for each of the voice and data call types.

Figure 3:
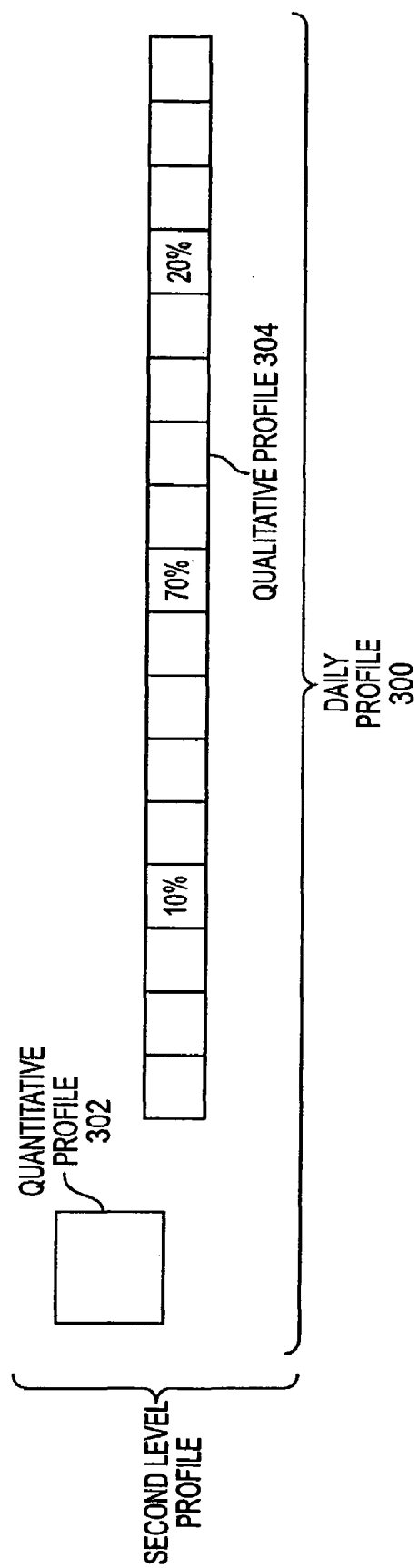
FIG. 3 is a block diagram of a second level profile as the result of prototyping the first level profile.

Following the first level profile processing referred to as the call profile prototyping and described above, the second level profile is created on the basis of the extracted call prototypes. The second level profile is a so-called daily profile and represents the short-term behavior of a customer. As illustrated in FIG. 3, a daily profile 300 for a particular customer includes two parts: a quantitative profile 302 and a qualitative profile 304. The quantitative profile 302 indicates the usage volume, that is, the number of calls made in one day by the customer. The qualitative profile 304 denotes the nature of calls placed by the customer during the day. On the basis of the above-mentioned representative attributes of the telephone call, the qualitative profile 304 specifies for a particular day how long the calls lasted, to where and at what time they were placed, etc.

In particular, the qualitative profile 304 is a vector containing an entry for each call prototype extracted from the call profile (the first level profile). The entry represents how many calls, in terms of a percentage of the total daily calls, represented by a particular call prototype were made by the customer on a given day, as shown in FIG. 3. For example, 20% of all daily calls were placed by the customer between 4 p.m. and 6 a.m. on Dec. 31, 1998, lasted between 5 to 10 minutes, and were international calls. Referring to the above-mentioned example, 1,152 call prototypes are determined; and each of those call prototypes is associated with a value that indicates a percentage of all calls made during the 24-hour period, for example. Due to the diverse attributes of telephone calls, the qualitative profile 304, as defined by the vector shown in FIG. 3, represents a multi-dimensional probability distribution of calls made on a given day.

Figure 4A:
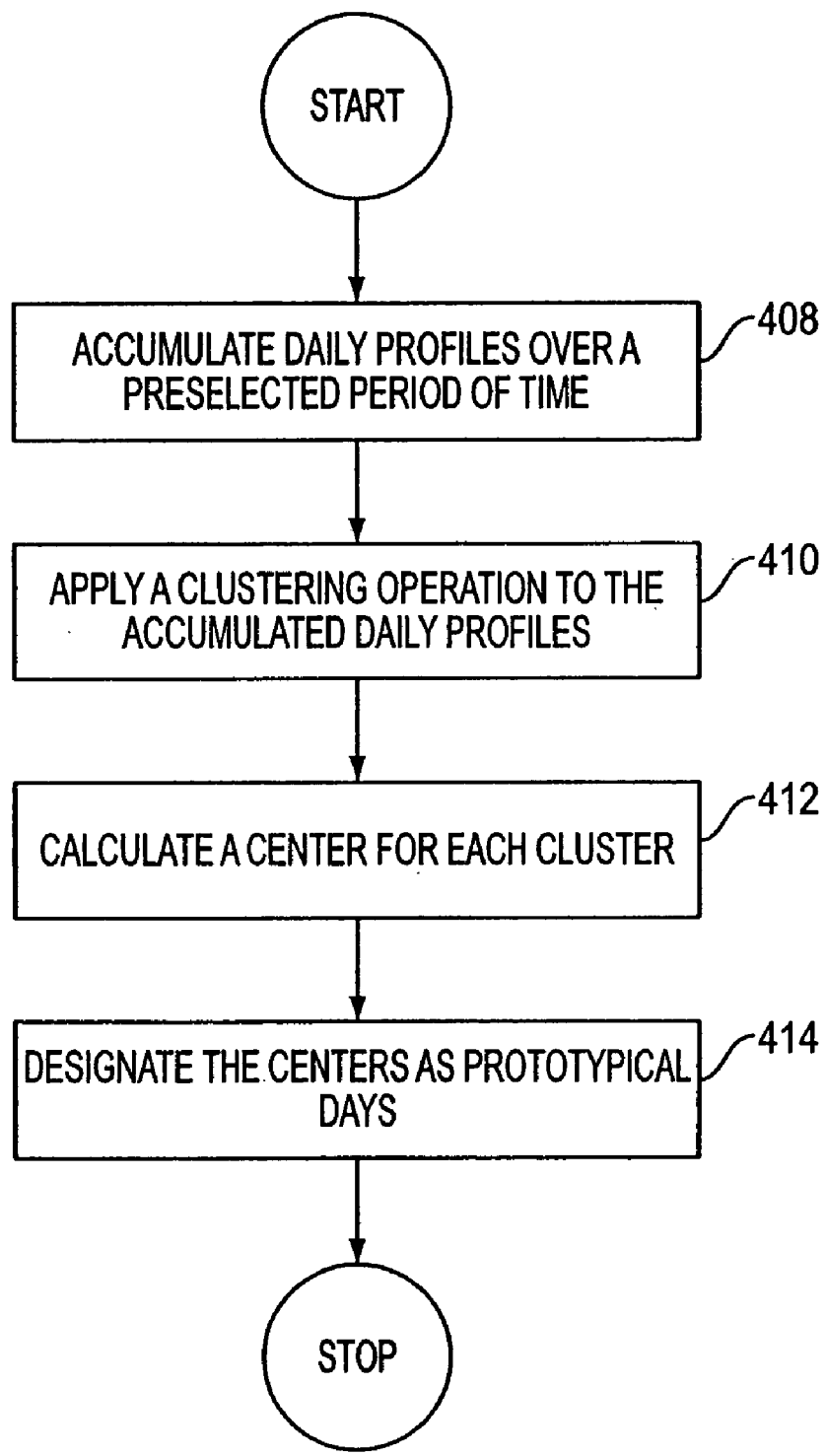
FIG. 4A is a flowchart for extracting daily prototypes according to the present invention.
Figure 4B:
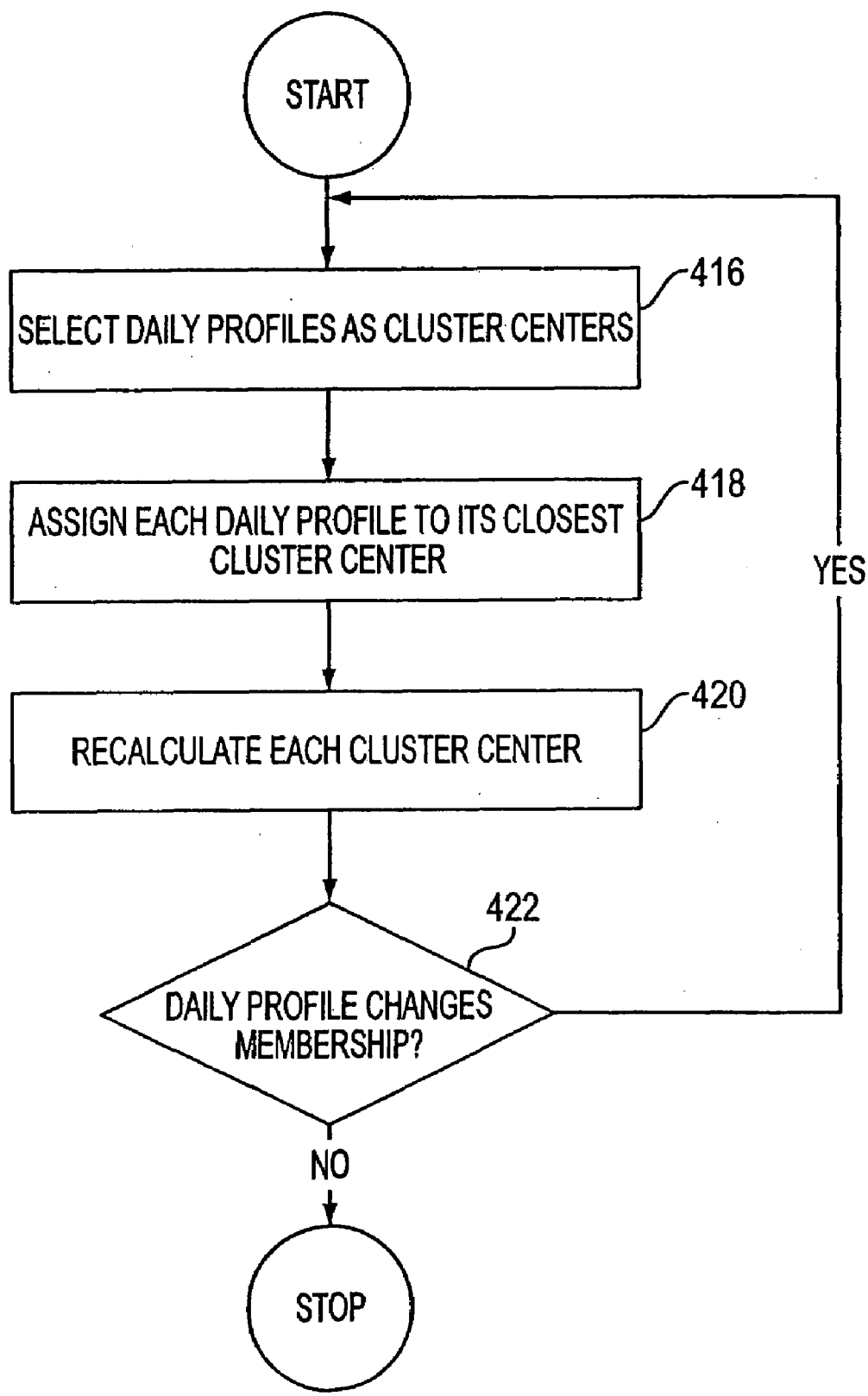
FIG. 4B is a flowchart for a clustering operation according to the present invention.
Figure 4C:
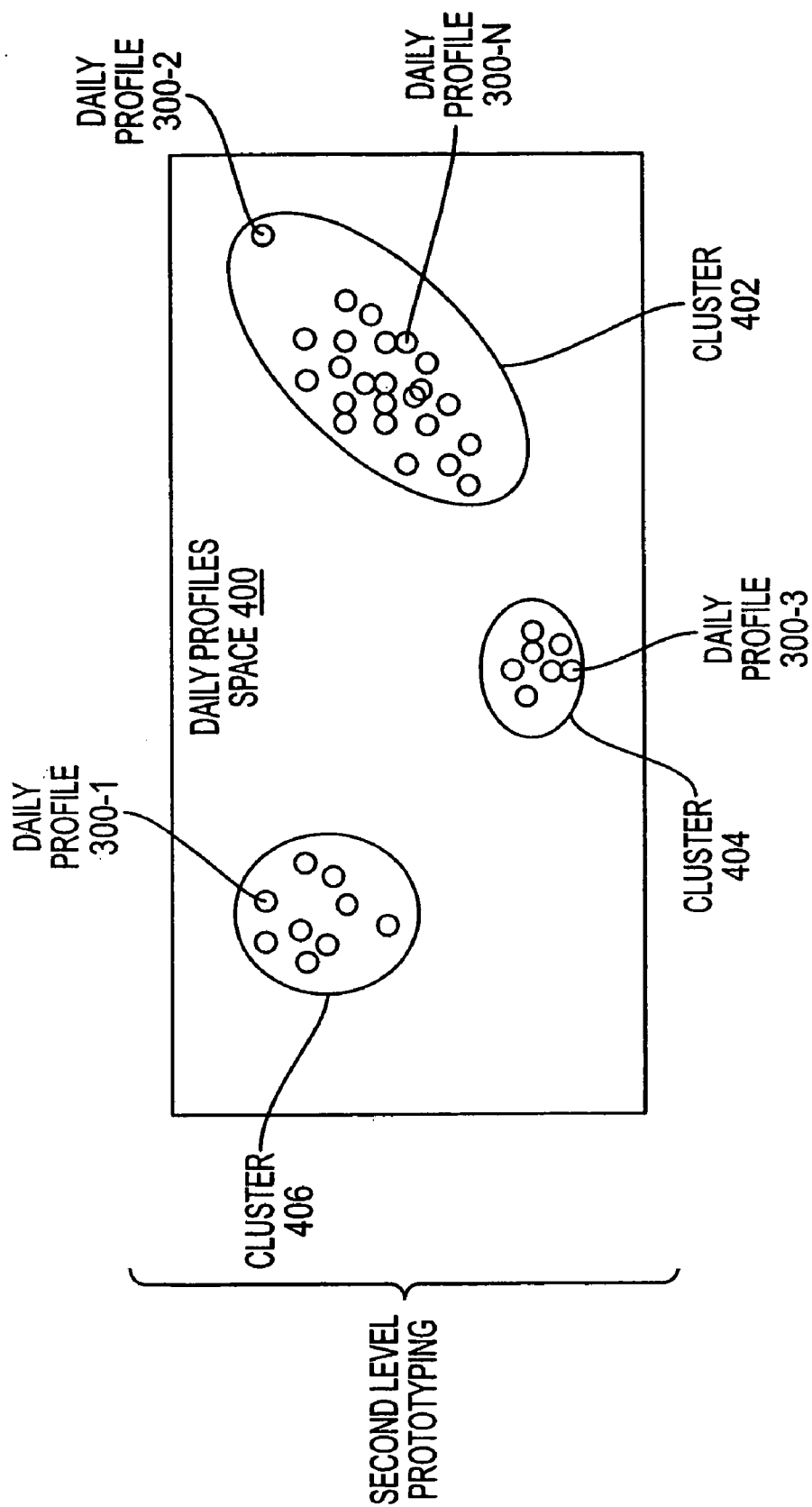
FIG. 4C graphically illustrates the operation of extracting daily prototypes from the second level profile of FIGS. 4A and 4C.

As illustrated in FIG. 4C, a daily profiles space 400 contains all possible daily profiles. The number of all possible daily profiles is infinite, and consequently is unmanageable due to computational and storage constraints. Therefore, it is needed to represent the daily profiles space 400 by a finite number of daily profiles. For this purpose, the daily profiles 300 are sampled over a preselected period of time, for example 60 days.

A clustering operation is then applied to the sampled set of daily profiles, and daily prototypes (so-called prototypical days) are determined on the basis of the clustering operation. The operation of extracting daily prototypes from the daily profiles 300 (the second level profile) is graphically shown in FIG. 4C to facilitate the explanation of this operation. The clustering operation arranges the daily profiles 300-1, 300-2, 300-3, . . . 300-N into several clusters 402, 404, 406 as shown in FIG. 4C (step 410 in FIG. 4A). The clustering operation of step 410 in FIG. 4A includes the following steps:

1. In the space of daily profiles, randomly selecting a number of daily profiles for designation as cluster centers (step 416 in FIG. 4B).
2. Assigning each daily profile to its closest cluster center (step 418 in FIG. 4B).
3. Recalculating each cluster center as the Euclidean centroid of daily profiles assigned to the corresponding cluster center (step 420 in FIG. 4B).
4. Repeating steps 1 through 3 until no daily profile changes membership among the clusters (step 422 in FIG. 4B).

The clustering operation is aimed at minimizing the sum of squared distances between daily profiles and their associated cluster center. The iterative procedure of recalculating the new cluster center as the Euclidean centroid of the locally assigned daily profiles accomplishes the minimization operation.

To calculate those distances, a Cumulative Distribution-based (CD) distance function based on cumulative distribution is proposed as follows. In the one-dimensional case, the distance between two continuous probability distributions is defined as follows:

Let $f_1(x)$ and $f_2(x)$ be two probability distributions of a random variable X. The distance between $f_1(x)$ and $f_2(x)$, denoted as $d(f_1, f_2)$ is:

$$d(f_1, f_2) = \left\{ \frac{1}{(x_{max} - x_{min})} \int_{x_{min}}^{x_{max}} (F_1(x) - F_2(x))^2 dx \right\}^{1/2} \quad (1)$$

where $\forall (x > X_{max}, x < X_{min}) \; \forall (f \text{ density function on } X)$ $f(x) = 0$ and $F(x^*) = P(X \le x^*) = \int_{x_{min}}^{x^*} f(x) dx$ F(x) is the cumulative distribution corresponding to density function f(x). $X_{max}$ and $X_{min}$ are the maximum and minimum values respectively that the random variable X can reach. $X_{max}$ and $X_{min}$ are defined such that the probability of values outside $(X_{min}, X_{max})$ is insignificant. $X_{max}$ and $X_{min}$ do not depend on the two density functions being compared, but solely on the random variable X. The denominator is used for normalization, so $0 \le d(f_1, f_2) \le 1$ is obtained.

In the discrete, ordinal case, the domain of the random variable X is $D = \{x_1, x_2, \ldots, x_n\}$, $x_i > x_j \Leftrightarrow i > j$, and the distance between two probability distributions is $$d(p_1, p_2) = \sqrt{\frac{1}{x_n - x_1} \sum_{j=1}^{n-1} (F_1(x_j) - F_2(x_j))^2 \delta_j} \quad (2)$$

where $\delta_j = x_{j+1} - x_j$

In the discrete case, the cumulative distribution is a step-function, and the formula is a simplification of the general formula for the subset of discrete probability distribution. $x_1$ and $X_n$, the smallest and largest discrete values, respectively, serve as $X_{min}$ and $X_{max}$. $\delta_j$ are the differences between consecutive discrete values. It is noted that $\delta_j$ are not necessarily equal, that is, the discrete values do not have to increase by a fixed value. Therefore, to improve computation efficiency, only $x_j$ is considered such that $P_i(x_j) \ne 0$ for (i=1,2). In that case, $\delta_j$ would be the difference between two consecutive non-zero $x_j$'s. Binary random variables are treated as discrete ordinal random variables, with the domain $\{0,1\}$. In the discrete, non-ordinal case, such as the call type for example, the domain consists of non-numeric values. It is assumed that the similarity between each pair of values is equal. In this case, the attribute $X^i$ is replaced with $n_i$ binary attributes, where $n_i$ is the number of values of attribute i.

In the multi-dimensional discrete case:

$$d(p_1, p_2) = \left( \sum_{i=1}^{d} \left( \frac{w_i}{(x_{n_i}^i - x_1^i)} \sum_{j=1}^{n_i - 1} (F_1(x_j^i) - F_2(x_j^i))^2 \delta_j \right) \right)^{1/2} \quad (3)$$

where $F(x_j^i) = P(X^i \le x_j^i) = \sum_{l=1}^{j} P(x_l^i)$.

$w_i$ is a weight for attribute i of the call profile.

An update of clusters is carried out in the following manner. The clustering operation performs the above-described steps 1–4. If a daily profile is not close enough to any of the existing cluster centers, new cluster and cluster center are formed. Hence, the clustering operation dynamically adds new cluster(s) if a daily profile is beyond a predetermined distance from the existing cluster centers.

Following the clustering operation as described above, a daily prototype (a prototypical day) is calculated for each cluster (step 412 in FIG. 4A). In particular, following the completion of the iterative clustering operations as described above, the daily profiles designated as cluster centers become daily prototypes (step 414 in FIG. 4A). As the result, each cluster is defined by a daily prototype that represents all of the daily profiles associated with a respective cluster.

After the second level profile processing referred to as the daily profile prototyping and described above, the third level profile is generated on the basis of the extracted daily prototypes. The third level profile is the overall profile of the customer and represents his/her long-term so-called "normal" behavior. There is an entry in the overall profile vector for each daily prototype extracted from the second level profile (daily profile). As shown in FIG. 5, each entry is a record 500 containing 3 fields. The first field 502 indicates the number of days that a daily prototype has been observed during the preselected period of time. The second field 504 shows the total number of telephone calls made during those days. That is, the number of calls made on each day, as indicated in the first field 502, are summed. The third field 506 is the sum of squared quantitative profiles. That is, the number of calls made on each day as indicated in the first field 502 is squared, and then the products are summed.

Figure 6:
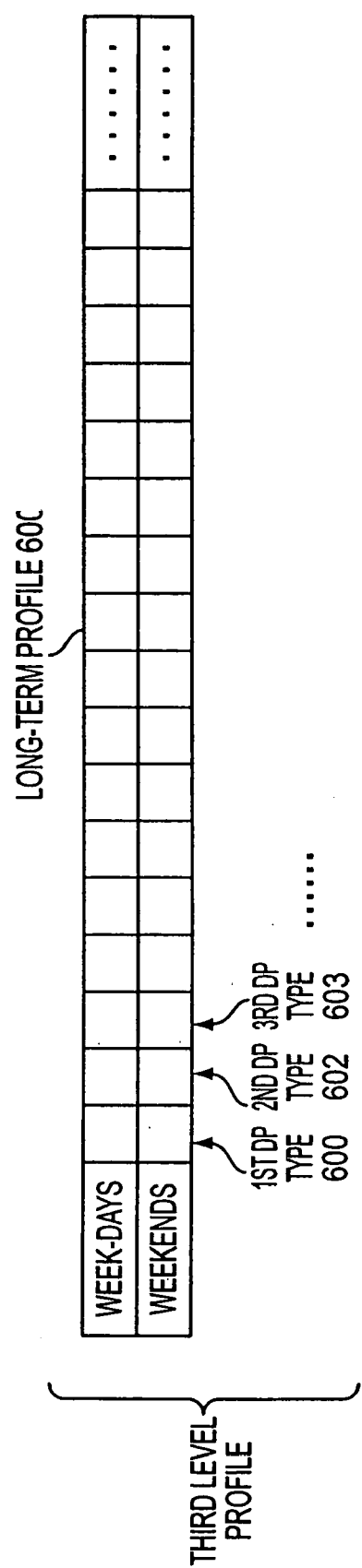
FIG. 6 is a block diagram of a third level profile containing daily prototype records.

FIG. 6 shows the long-term or overall profile 600 of the customer calling behavior, designated as the third level profile, containing entries for all daily prototypes, such as a first Daily Prototype (DP type) 600, a second Daily Prototype (DP type) 602, a third Daily Prototype (DP type) 604, etc. As shown in FIG. 6, the customer behaviors on weekdays and weekends are represented separately to better approximate the customer overall calling behavior. The third level profiles are constantly updated with newly introduced normal second level profiles. This is done to capture changes in the customer's normal behavior.

Figure 7:
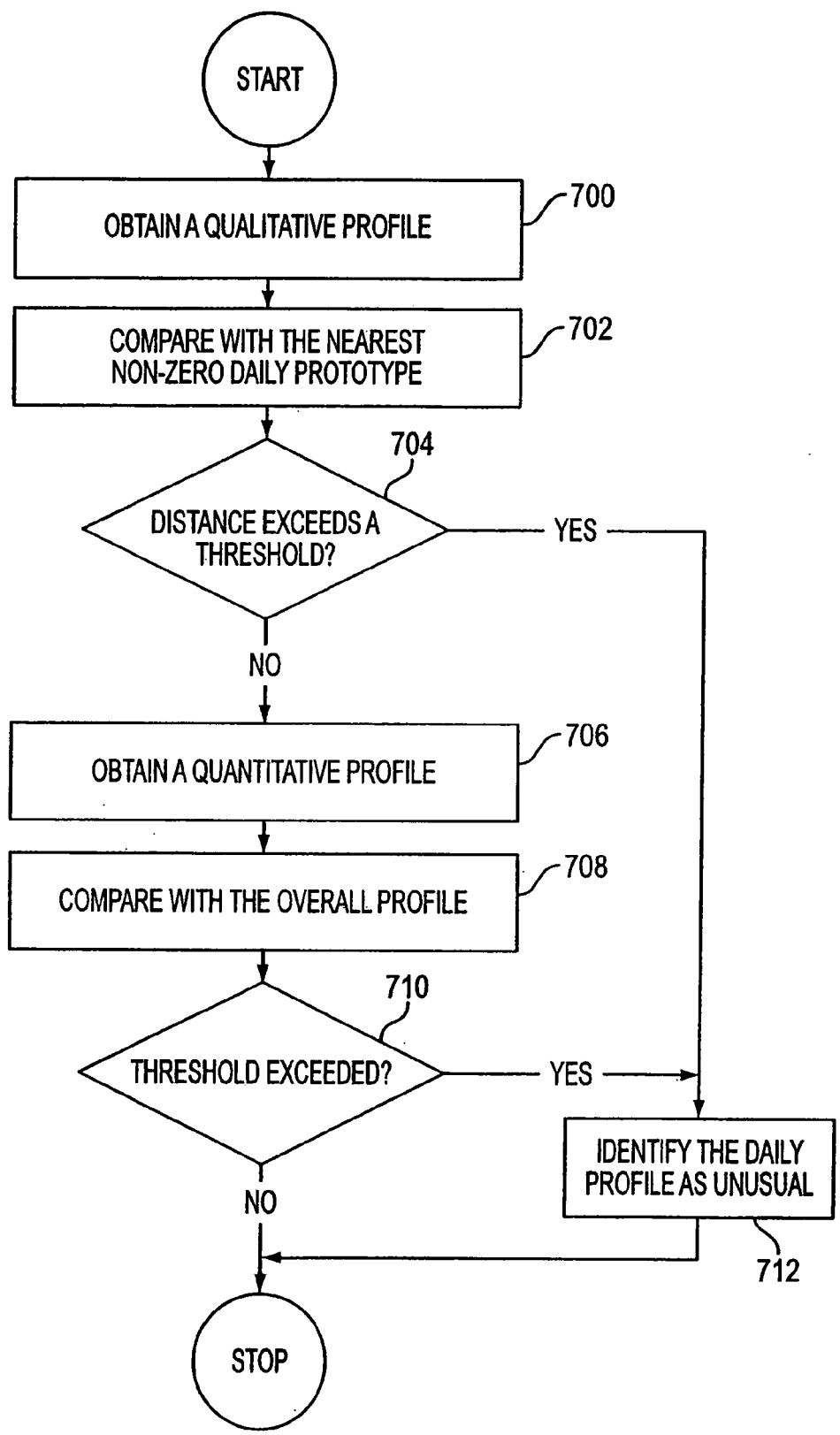
FIG. 7 is a flowchart for detecting a deviation from the normal behavior profile.

After generating the normal behavior model comprising the three levels as described above, a deviation from the normal calling behavior is detected as shown in FIG. 7. As stated above, the daily profile includes two parts: the quantitative profile and the qualitative profile. Matching a new daily profile to the third level (overall) profile is executed in two stages that involve both quantitative and qualitative profiles. First, the qualitative profile is checked, and if there is a "qualitative match", the quantitative profile is then examined.

In particular, the qualitative profile is obtained (step 700), and a match with the third level profile is found if the qualitative profile is substantially close to the nearest non-zero daily prototype of the customer (step 702). That is, the qualitative profile matches the third level profile when the distance between the qualitative profile and the nearest non-zero daily prototype does not exceed a predetermined threshold value, as determined in step 704. The above comparing operation is expressed as follows:

(3) $\text{Diff} \leq T$, where

Diff=a difference between qualitative profiles (measures) of a daily prototype and of the daily profile under examination as determined on the basis of the CD-distance function;

T=a predetermined threshold value.

If the distance does not exceed the threshold (step 706), the second stage of analyzing the quantitative profile is carried out. In this stage, the quantitative profile is obtained (step 706), and is compared with the third level profile on the basis of the following (step 708): a mean value of the daily prototype closest to the examined daily profile, a standard deviation of the daily prototype closest to the examined daily profile, and a predetermined threshold value. Expressed as an equation, the above comparing operation is as follows:

(4) $(DP-M)/\sigma \leq T$, where

DP=the quantitative daily profile under examination;

M=average number of calls in days of the daily prototype closest to the daily profile DP;

σ=the standard deviation of the number of calls in days of the daily prototype closest to the daily profile DP;

T=a predetermined threshold value (measured in terms of standard deviation).

If the predetermined threshold value is not exceeded as determined in step 710, then the daily profile under examination is not identified as fraudulent or unusual. However, if any of the above equations (3) or (4) do not hold true, then the daily profile is marked as fraudulent or unusual, and/or an alert is initiated (step 712). According to this aspect of the present invention, the deviation from the normal calling behavior as described above represents a genuine dissimilarity between any two instances of the second level profile. The genuine dissimilarity is assured by the application of the CD-distance function.

It is understood, of course, that the present invention described above with reference to the telephone call activities is not limited to such embodiment only. The present invention is equally applicable to other user transactions and activities by identifying the short-term and long-term user behavior using the three-level profile and by detecting a deviation from the behavior profile. Such activities include credit card or debit card usage, purchases of goods and/or services on-line over the Internet or in-person, and any other multiple transactions by a customer/user over a preselected period of time.

In addition, the present invention may be used for detecting changes in customer behavior for other purposes that may not be related to fraud detection. Such purposes may include identifying marketing opportunities and offering new incentives or price plans to a customer following a behavioral change.

Furthermore, the above-described operations of identifying changes in the behavior may be applied, in addition to an individual customer, to any selected entity, such as a group of people, segments of population, countries, etc.

In addition, in the above exemplary embodiment, the short-term behavior (second level profile) includes any calling activity during the 24-hour time interval. Similarly, the long-term behavior (third level profile) is representatively set to a 60-day interval. The present invention is not limited to such definitions of the short-term and long-term behaviors which can be defined for any time interval selected on the basis of the frequency of user transactions.

It is understood by those skilled in the art that the term "telecommunications" as used herein is defined as the transmission and reception of signals, either electrical or optical, via any medium, such as a wired or wireless conduit.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A computer implemented method for determining a normal customer behavior profile that includes a plurality of transactions pertaining to an activity, said normal behavior profile being used to alert of an unusual activity, said method comprising the steps of:

selecting, at a computer, a number of prototypical transactions from said plurality of transactions;

arranging, at the computer, the selected prototypical transactions collected during a first predetermined time interval into a first behavior profile;

obtaining, at the computer, a plurality of first behavior profiles during a second predetermined time interval that is comprised of a plurality of first predetermined time intervals;

arranging, at the computer, the first behavior profiles obtained during said second predetermined time interval into a number of clusters;

determining, at the computer, a prototypical first behavior profile for each cluster; and arranging, at the computer, the determined prototypical first behavior profiles into a plurality of records for representing a second behavior profile;

wherein said steps of arranging the first behavior profiles and determining said prototypical first behavior profile comprise:

designating, at the computer, a number of first behavior profiles as respective centers for the clusters;

finding, at the computer, a closest center to each remaining first behavior profile;

assigning, at the computer, each remaining first behavior profile to said closest center;

recalculating, at the computer, each center for a corresponding cluster according to said step of assigning; and repeating, at the computer, said steps of designating, finding, assigning and recalculating until a membership of each cluster does not change.

2. A computer implemented method for determining a normal customer behavior profile that includes a plurality of transactions pertaining to an activity, the normal customer behavior profile being used to alert of an unusual activity, the method comprising the steps of:

selecting, at a computer, a number of prototypical transactions from the plurality of transactions;

arranging, at the computer, the selected prototypical transactions collected during a first predetermined time interval into a first behavior profile;

obtaining, at the computer, a plurality of first behavior profiles during a second predetermined time interval that is comprised of a plurality of first predetermined time intervals;

arranging, at the computer, the first behavior profiles obtained during the second predetermined time interval into a number of clusters;

determining, at the computer, a prototypical first behavior profile for each cluster; and arranging, at the computer, the determined prototypical first behavior profiles into a plurality of records for representing a second behavior profile;

wherein said first behavior profile includes the number of transactions; and wherein each record includes the number of times a respective prototypical first behavior profile has been observed during said second predetermined time interval, also includes a total number of transactions carried out during said second predetermined time interval, and further includes a sum of squared number of transactions during said first predetermined time interval within said second predetermined time interval.

3. The method according to claim 2, wherein each transaction is defined by non-numerical and numerical attributes which are qualitative and quantitative measures of the transaction, respectively.

4. The method according to claim 3, wherein said step of selecting the prototypical transactions includes dividing the numerical attributes into a predetermined number of values and associating the values with the non-numerical attributes.

5. The method according to claim 2, wherein each prototypical first behavior profile is located at a respective center of each cluster.

6. The method according to claim 2, wherein said first behavior profile includes a vector representing a multi-dimensional probability distribution of the transactions carried out during said first predetermined time interval.

7. The method according to claim 2, wherein said second behavior profile is separately maintained for each customer for each type of said first predetermined time interval.

8. A computer implemented method for detecting a deviation from a customer behavior profile that includes a plurality of transactions, the method comprising the steps of:

selecting, at the computer, a number of prototypical transactions from a plurality of transactions of a customer;

arranging, at the computer, the selected prototypical transactions collected during a first predetermined time interval into a first behavior profile of the customer;

obtaining, at the computer, a plurality of first behavior profiles of the customer during a second predetermined time interval that is comprised of a plurality of first predetermined time intervals;

arranging, at the computer, the first behavior profiles obtained during the second predetermined time interval into a number of clusters;

determining, at the computer, a prototypical first behavior profile for each cluster;

arranging, at the computer, the determined prototypical first behavior profiles into a plurality of records for representing a second behavior profile of the customer determined over the second predetermined time interval; and comparing, at the computer, a new first behavior profile representing transactions of the customer with each record of the second behavior profile to identify a deviation from the second behavior profile if none of the records of the second behavior profile substantially matches the new first behavior profile;

wherein said first behavior profile includes the number of transactions; and wherein each record includes the number of times a respective prototypical first behavior profile has been observed during said second predetermined time interval, also includes a total number of transactions carried out during said second predetermined time interval, and further includes a sum of squared number of transactions during said first predetermined time interval within said second predetermined time interval.

9. The method according to claim 8, wherein said deviation is designated as fraudulent on behalf of a customer.

10. The method according to claim 8, wherein said first behavior profile includes a vector representing a multi-dimensional probability distribution of the transactions carried out during said first predetermined time interval.

11. The method according to claim 8, wherein said second behavior profile is separately maintained for each customer for each type of said first predetermined time interval.

12. Apparatus comprising a programmable controller for determining a normal customer behavior profile that includes a plurality of transactions pertaining to an activity, said normal behavior profile being used to alert of an unusual activity, the apparatus comprising:

means for selecting a number of prototypical transactions from said plurality of transactions;

means for arranging the selected prototypical transactions collected during a first predetermined time interval into a first behavior profile;

means for obtaining a plurality of first behavior profiles during a second predetermined time interval that is comprised of a plurality of first predetermined time intervals;

means for arranging the first behavior profiles obtained during the second predetermined time interval into a number of clusters;

means for determining a prototypical first behavior profile for each cluster; and means for arranging the determined prototypical first behavior profiles into a plurality of records for representing a second behavior profile determined over the second predetermined time interval;

wherein said means for arranging the first behavior profiles and means for determining said prototypical first behavior profile comprise:

means for designating a number of first behavior profiles as respective centers for the clusters;

means for finding a closest center to each remaining first behavior profile;

means for assigning said each remaining first behavior profile to said closest center;

means for recalculating each center for a corresponding cluster according to said step of assigning; and means for repeating the operations of designating, finding, assigning and recalculating until a membership of each cluster does not change.

13. Apparatus comprising a programmable controller for determining a normal customer behavior profile that includes a plurality of transactions pertaining to an activity, said normal behavior profile being used to alert of an unusual activity, said apparatus comprising:

means for selecting a number of prototypical transactions from said plurality of transactions;

means for arranging the selected prototypical transactions collected during a first predetermined time interval into a first behavior profile;

means for obtaining a plurality of first behavior profiles during a second predetermined time interval that is comprised of a plurality of first predetermined time intervals;

means for arranging the first behavior profiles obtained during said second predetermined time interval into a number of clusters;

means for determining a prototypical first behavior profile for each cluster; and means for arranging the determined prototypical first behavior profiles into a plurality of records for representing a second behavior profile determined over said second predetermined time interval;

wherein said first behavior profile includes the number of transactions; and wherein each record includes the number of times a respective prototypical first behavior profile has been observed during said second predetermined time interval, also includes a total number of transactions carried out during said second predetermined time interval, and further includes a sum of squared number of transactions during said first predetermined time interval within said second predetermined time interval.

14. The apparatus according to claim 13, wherein each transaction is defined by non-numerical and numerical attributes which are qualitative and quantitative measures of the transaction, respectively.

15. The apparatus according to claim 13, wherein said means for selecting includes means for dividing said one numerical attribute into a predetermined number of values and for associating the values with the non-numerical attributes.

16. The apparatus according to claim 13, wherein each prototypical first behavior profile is located at a respective center of each cluster.

17. The apparatus according to claim 13, wherein said first behavior profile includes a vector representing a multi-dimensional probability distribution of the transactions carried out during said first predetermined time interval.

18. The apparatus according to claim 13, wherein said second behavior profile is separately maintained for each customer for each type of said first predetermined time interval.

19. Apparatus comprising a programmable controller for detecting a deviation from a customer behavior profile that includes a plurality of transactions, the apparatus comprising:

means for selecting a number of prototypical transactions from a plurality of transactions of a customer;

means for arranging the selected prototypical transactions collected during a first predetermined time interval into a first behavior profile of the customer;

means for obtaining a plurality of first behavior profiles of the customer during a second predetermined time interval that is comprised of a plurality of first predetermined time intervals;

means for arranging the first behavior profiles obtained during said second predetermined time interval into a number of clusters;

means for determining a prototypical first behavior profile for each cluster;

means for arranging the determined prototypical first behavior profiles into a plurality of records for representing a second behavior profile of the customer determined over the second predetermined time interval; and means for comparing a new first behavior profile representing transactions of the customer with each record of the second behavior profile to identify a deviation from the second behavior profile if none of the records of the second behavior profile substantially matches the new first behavior profile;

wherein said first behavior profile includes the number of transactions; and wherein each record includes the number of times a respective prototypical first behavior profile has been observed during said second predetermined time interval, also includes a total number of transactions carried out during said second predetermined time interval, and further includes a sum of squared number of transactions during said first predetermined time interval within said second predetermined time interval.

20. The apparatus according to claim 19, wherein said deviation is designated as fraudulent on behalf of a customer.

21. The apparatus according to claim 19, wherein said first behavior profile includes a vector representing a multi-dimensional probability distribution of the transactions carried out during said first predetermined time interval.

22. The apparatus according to claim 19, wherein said second behavior profile is separately maintained for each customer for each type of said first predetermined time interval.

* * * * *